(12) United States Patent
Katou et al.

(10) Patent No.: US 7,458,448 B2
(45) Date of Patent: Dec. 2, 2008

(54) HYDRAULIC SHOCK ABSORBER

(75) Inventors: Hajime Katou, Hadano (JP); Hikaru Nakajima, Atsugi (JP); Takao Nakadate, Yamoto (JP)

(73) Assignees: Hitachi, Ltd., Tokyo (JP); Nissan Motor Co., Ltd., Kanagawa (JP)

(*) Notice: Subject to any disclaimer, the term of this patent is extended or adjusted under 35 U.S.C. 154(b) by 115 days.

(21) Appl. No.: 11/134,453

(22) Filed: May 23, 2005

(65) Prior Publication Data

US 2005/0263363 A1    Dec. 1, 2005

(30) Foreign Application Priority Data

May 25, 2004    (JP)    ............... 2004-154964

(51) Int. Cl.
*F16F 9/50*    (2006.01)
(52) U.S. Cl. .................. 188/282.6; 188/313; 188/317; 188/322.15
(58) Field of Classification Search ................ 188/280, 188/282.5, 282.6, 282.8, 283, 313, 316, 317, 188/319.1, 322.13, 322.14, 322.15, 322.22
See application file for complete search history.

(56) References Cited

U.S. PATENT DOCUMENTS

| | | | | |
|---|---|---|---|---|
| 4,512,447 A | | 4/1985 | Miura | |
| 4,953,671 A | * | 9/1990 | Imaizumi | ................ 188/282.3 |
| 5,018,608 A | * | 5/1991 | Imaizumi | ............... 188/322.15 |
| 5,293,971 A | * | 3/1994 | Kanari et al. | ............ 188/282.1 |
| 5,404,973 A | * | 4/1995 | Katoh et al. | ............. 188/282.1 |
| 6,474,454 B2 | * | 11/2002 | Matsumoto et al. | ...... 188/282.6 |
| 7,070,029 B2 | * | 7/2006 | Deferme | ................ 188/322.15 |
| 7,322,449 B2 | * | 1/2008 | Yamaguchi | ................. 188/313 |
| 2003/0132073 A1 | | 7/2003 | Nakadate | |
| 2005/0279597 A1 | * | 12/2005 | Yamaguchi | ............ 188/322.13 |

FOREIGN PATENT DOCUMENTS

| | | | |
|---|---|---|---|
| GB | 2 113 355 | | 8/1983 |
| JP | 2-278026 | | 11/1990 |
| JP | 2003278819 | A * | 10/2003 |
| JP | 2004257507 | A * | 9/2004 |

* cited by examiner

*Primary Examiner*—Thomas J Williams
(74) *Attorney, Agent, or Firm*—Wenderoth, Lind & Ponack, L.L.P.

(57) ABSTRACT

A hydraulic shock absorber in which the flow of hydraulic fluid induced in each of extension and compression hydraulic fluid passages, by sliding movement of a piston, is controlled by a main disk valve to generate damping force. The valve opening pressure of the main disk valve is adjusted by the pressure in a back-pressure chamber. In a low piston speed region, the main disk valve closes a back-pressure chamber inlet passage. Therefore, the pressure in the backpressure chamber will not rise, and sufficiently small damping force is obtained. When the main disk valve opens, the backpressure chamber inlet passage opens simultaneously. Consequently, the pressure in the backpressure chamber rises, and the damping force increases.

7 Claims, 8 Drawing Sheets

HYDRAULIC SHOCK ABSORBER

BACKGROUND OF THE INVENTION

The present invention relates to a hydraulic shock absorber suitable for use in a suspension system of a vehicle, for example, an automobile.

In general, a cylinder type hydraulic shock absorber attached to a suspension system of a vehicle, e.g. an automobile, includes a cylinder having a hydraulic fluid sealed therein. A piston is slidably fitted in the cylinder. The piston is connected with a piston rod to form a piston assembly. The piston assembly is provided with damping force generating mechanisms each including a hydraulic fluid passage, an orifice, a disk valve, etc. The hydraulic fluid is induced to flow through the hydraulic fluid passage by sliding movement of the piston in the cylinder caused by the stroke of the piston rod. The flow of the hydraulic fluid is controlled by the orifice and the disk valve to generate damping force. In a low speed region of the piston speed, damping force is generated by the orifice. In a high piston speed region, the disk valve deflects to open, thereby preventing an excessive rise in damping force.

In the above-described conventional hydraulic shock absorber, however, the damping force generated in the low piston speed region depends on the flow path area of the orifice. In the high piston speed region, the damping force depends on the preset valve opening pressure of the disk valve. Accordingly, the conventional hydraulic shock absorber suffers from a low degree of freedom for setting damping force characteristics.

Under these circumstances, a hydraulic shock absorber designed to increase the degree of freedom for setting damping force characteristics has been proposed, as disclosed, for example, in Japanese Patent Application Unexamined Publication (KOKAI) No. Hei 2-278026. The hydraulic shock absorber has at the back of the disk valve a back-pressure chamber, a valve (second disk valve) for controlling a pressure introduced into the back-pressure chamber, and a relief valve that opens when the pressure in the back-pressure chamber reaches a predetermined pressure to relieve the pressure. A part of hydraulic fluid is introduced into the back-pressure chamber through an orifice passage to allow the pressure in the back-pressure chamber to act on the disk valve in the direction for closing the valve. The back pressure acting on the disk valve is adjusted by the valve (second disk valve) and the relief valve. More specifically, in the low piston speed region, the valve (second disk valve) is closed. Therefore, small damping force is generated. When the piston speed rises, the valve (second disk valve) opens to generate large damping force. When the piston speed rises further, the relief valve opens to generate damping force smaller than the above-described large damping force. Thus, it is possible to increase the degree of freedom for setting damping force characteristics.

However, the above-described conventional hydraulic shock absorber provided with a back-pressure chamber has the following problem. Because a valve (second disk valve) for controlling the pressure to be introduced into the back-pressure chamber is provided in addition to the disk valve that receives the pressure in the back-pressure chamber, the damping force generating mechanism becomes complicated in structure and long in axial length, resulting in an increased overall size.

The present invention was made in view of the above-described circumstances. Accordingly, an object of the present invention is to provide a hydraulic shock absorber that is capable of increasing the degree of freedom for setting damping force characteristics to obtain appropriate damping force characteristics, and that has a damping force generating mechanism simplified in structure to allow a reduction in overall size.

SUMMARY OF THE INVENTION

The present invention provides a hydraulic shock absorber including a cylinder having a hydraulic fluid sealed therein. A piston is slidably fitted in the cylinder. A piston rod is connected at one end thereof to the piston. The other end of the piston rod extends to the outside of the cylinder. A main valve generates damping force by controlling the flow of hydraulic fluid induced by sliding movement of the piston. A back-pressure chamber allows its internal pressure to act on the main valve in the direction for closing the main valve. A back-pressure chamber inlet passage introduces a part of hydraulic fluid of the induced flow into the back-pressure chamber to control opening of the main valve. The hydraulic shock absorber is further provided with a valve mechanism that increases the flow path area of the back-pressure chamber inlet passage when the main valve opens.

In this hydraulic shock absorber, when the main valve is closed, the flow path area of the back-pressure chamber inlet passage is kept small (including zero) by the valve mechanism. Therefore, in a low speed region of the piston speed, the pressure in the back-pressure chamber will not rise. Consequently, the back pressure acting on the main valve is small, and damping force can be made sufficiently small. As the main valve opens in accordance with the rise in the piston speed, the flow path area of the back-pressure chamber inlet passage increases, and the pressure in the back-pressure chamber increases. Consequently, damping force generated by the main valve increases. By adjusting the pressure in the back-pressure chamber in this way, the degree of freedom for setting damping force characteristics can be increased to obtain appropriate damping force characteristics. In addition, the damping force generating mechanism can be simplified in structure and reduced in size.

According to one embodiment of the present invention, the hydraulic shock absorber is provided with a relief valve that opens when the pressure in the back-pressure chamber reaches a predetermined pressure to relieve the pressure.

The hydraulic shock absorber is provided with a relief valve for relieving the pressure from the back-pressure chamber. The relief valve opens when the piston speed rises further and consequently the pressure in the back-pressure chamber reaches a predetermined pressure. Thus, it is possible to suppress an excessive rise in damping force generated by the main valve.

According to another embodiment of the present invention, the hydraulic shock absorber has an elastic seal member integrally secured to an outer peripheral portion on the back of the main valve to define the back-pressure chamber.

The hydraulic shock absorber has an elastic seal member integrally secured to the main valve to define the back-pressure chamber. Therefore, it is possible to improve the sealing properties of the back-pressure chamber between the elastic seal member and the main valve. In addition, the assembleability of the damping force generating mechanism can be improved.

According to another embodiment of the present invention, the valve mechanism of the hydraulic shock absorber has at least one orifice in a portion of the piston on which the main valve liftably rests. The orifice extends from the outer peripheral edge of the portion of the piston to the inner peripheral edge thereof. The hydraulic fluid is introduced into the back-pressure chamber through the orifice.

With this hydraulic shock absorber, an orifice area when the valve mechanism is closed can be set simply by providing at least one orifice in a portion of the piston on which the main valve liftably rests such that the orifice extends from the outer peripheral edge of the portion of the piston to the inner peripheral edge thereof. Thus, it is possible to suppress variations in the orifice area and hence possible to obtain stable orifice characteristics.

According to another embodiment of the present invention, the valve mechanism of the hydraulic shock absorber includes an opening provided in the main valve, a notched disk installed upstream of the main valve and provided with at least one radially extending notch communicating with the opening, and a blocking disk provided upstream of the notched disk to block a portion of the notch that faces the opening. When it opens, the main valve separates from the notched disk.

In this hydraulic shock absorber, a notched disk and a blocking disk are stacked in the order mentioned at the upstream side of the main valve having an opening. An orifice area when the valve mechanism is closed can be set appropriately by varying the width, thickness and number of notches provided in the notched disk. Thus, orifice area variations can be suppressed to obtain stable orifice characteristics.

According to another embodiment of the present invention, the hydraulic shock absorber is provided with a downstream orifice that allows the hydraulic fluid in the back-pressure chamber to communicate with the downstream side of the back-pressure chamber. When the main valve is closed, the back-pressure chamber inlet passage has a smaller flow path area than that of the downstream orifice.

In this hydraulic shock absorber, when the main valve is closed, the flow path area of the back-pressure chamber inlet passage is smaller than that of the downstream orifice. Consequently, a back pressure can be generated in the back-pressure chamber during the opposite stroke where a pressure is introduced into the back-pressure chamber from the downstream orifice. Therefore, there is no possibility of the main valve undesirably opening even when it receives a pressure during the opposite stroke in the valve opening direction.

According to another embodiment of the present invention, the hydraulic shock absorber has a seat portion for the main valve to rest on. The seat portion is provided radially outward of a sealing surface of the elastic seal member that seals the back-pressure chamber.

In this hydraulic shock absorber, a seat portion for the main valve to rest on is provided radially outward of the sealing surface of the elastic seal member that seals the back-pressure chamber. Accordingly, there is no possibility of the main valve being undesirably opened by the pressure acting thereon during the opposite stroke.

The above and other objects, features and advantages of the present invention will become more apparent from the following description of the preferred embodiments thereof, taken in conjunction with the accompanying drawings.

DETAILED DESCRIPTION OF THE INVENTION

Figure 1:
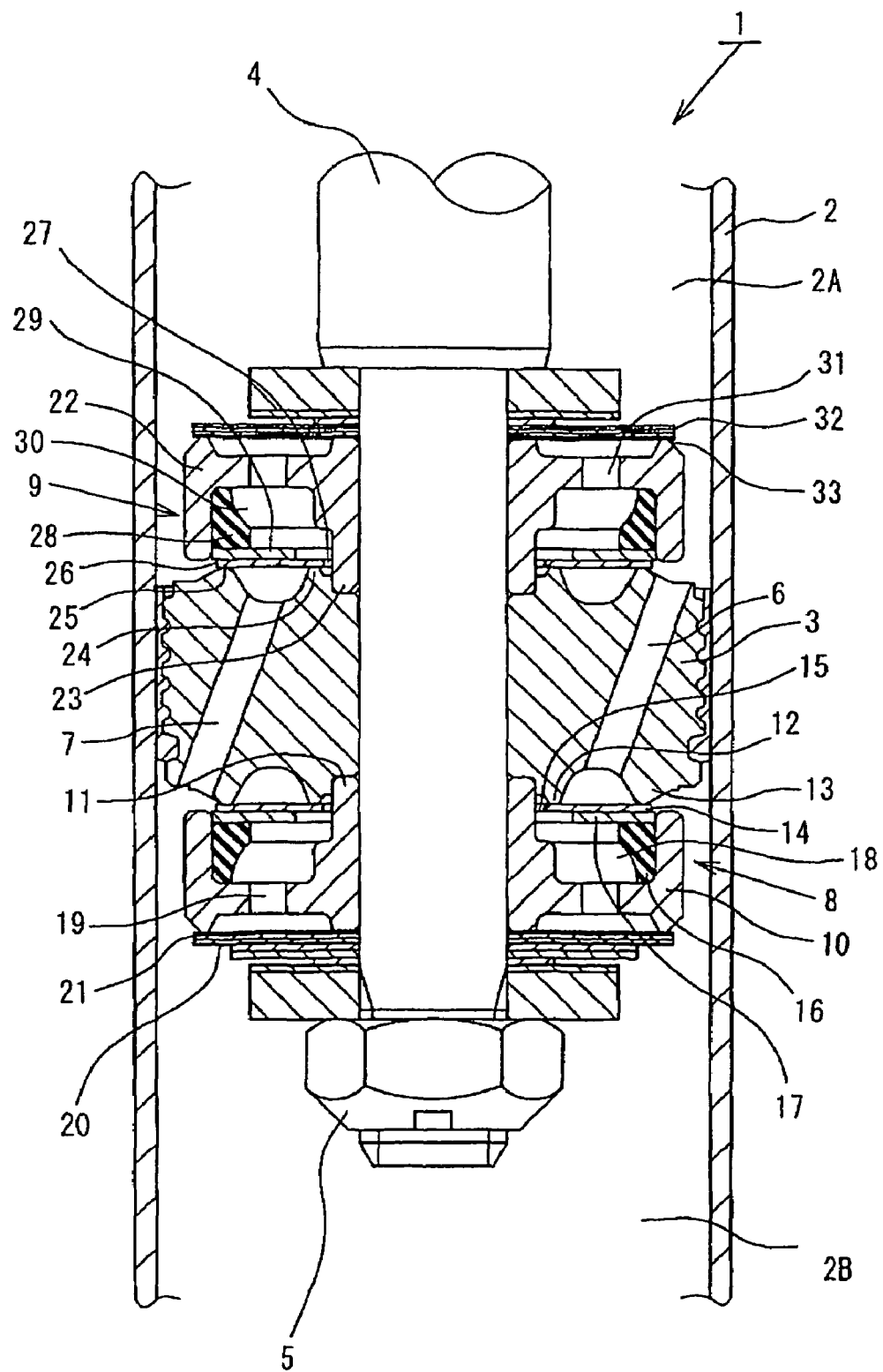
FIG. 1 is a vertical sectional view of an essential part of a hydraulic shock absorber according to a first embodiment of the present invention.

One embodiment of the present invention will be described below in detail with reference to the accompanying drawings. As shown in FIG. 1, a hydraulic shock absorber 1 according to this embodiment is a cylinder type hydraulic shock absorber attached to a suspension system of a vehicle, e.g. an automobile. The hydraulic shock absorber 1 has a double-cylinder structure including a cylinder 2 (only a part of the side wall thereof is shown in the figure) having a hydraulic fluid sealed therein. A piston 3 is slidably fitted in the cylinder 2. The piston 3 divides the inside of the cylinder 2 into two chambers, i.e. a cylinder upper chamber 2A and a cylinder lower chamber 2B. One end portion of a piston rod 4 is connected to the piston 3 with a nut 5. The other end portion of the piston rod 4 extends through a rod guide (not shown) and an oil seal (not shown), which are fitted to an upper end portion of the double-cylinder structure comprising the cylinder 2 and an outer cylinder (not shown). The end portion of the piston rod 4 projects to the outside. The cylinder lower chamber 2B is connected to a reservoir (not shown) through a base valve (not shown) having an appropriate flow resistance. The reservoir has the hydraulic fluid and gas sealed therein.

The piston 3 is provided with an extension hydraulic fluid passage 6 and a compression hydraulic fluid passage 7 for communication between the cylinder upper chamber 2A and the cylinder lower chamber 2B. An extension damping force generating mechanism 8 is provided at the cylinder lower chamber-side end of the piston 3 to generate damping force by controlling the flow of hydraulic fluid in the extension hydraulic fluid passage 6. A compression damping force generating mechanism 9 is provided at the cylinder upper chamber-side end of the piston 3 to generate damping force by controlling the flow of hydraulic fluid in the compression hydraulic fluid passage 7.

The extension damping force generating mechanism 8 will be described below. A valve member 10 is secured to the cylinder lower chamber-side end of the piston 3. The valve member 10 is in the shape of a circular cylinder, one end of which is substantially closed. The valve member 10 has a cylindrical guide portion 11 stood at the inner peripheral side of the bottom thereof. The guide portion 11 is fitted to the piston 3. The piston rod 4 extends through the guide portion 11 and is secured with the nut 5. An annular seat portion 12 projects from the inner periphery of the cylinder lower chamber-side end surface of the piston 3. Another annular seat portion 13 projects from the outer periphery of the cylinder lower chamber-side end surface of the piston 3. The extension hydraulic fluid passage 6 opens between the seat portions 12 and 13. A main disk valve 14 (main valve) is seated on the seat portions 12 and 13. The main disk valve 14 has its inner peripheral portion axially movably guided by the guide portion 11 of the valve member 10, so that the main disk valve 14 can rest on or separate from the seat portions 12 and 13 without deflecting. A back-pressure chamber inlet passage (upstream orifice) 15 is formed between the inner peripheral portion of the main disk valve 14 and the guide portion 11. The main disk valve 14 and the seat portion 12 constitute in combination a valve mechanism that opens or closes the back-pressure chamber inlet passage 15. The valve mechanism increases the effective flow path area of the back-pressure chamber inlet passage 15 when the main disk valve 14 opens. It should be noted that after the main disk valve 14 has opened to more than a predetermined degree, the flow path area of a passage leading to the back-pressure chamber inlet passage 15 becomes equal to the opening area of the passage 15 and so, the effective flow path area of the inlet passage 15 is kept constant thereafter.

The valve member 10 has an outer annular portion in the shape of a circular cylinder that is stood on the outer periphery of the bottom thereof. A cylindrical elastic seal member 16 is fitted to the inner peripheral side of the outer annular portion. The elastic seal member 16 presses the main disk valve 14 against the seat portions 12 and 13 through a seal ring 17. The elastic seal member 16 and the seal ring 17 form a back-pressure chamber 18 in the valve member 10 at the back of the main disk valve 14 such that the pressure in the back-pressure chamber 18 acts on the main disk valve 14 in the direction for closing the valve 14. When the main disk valve 14 lifts from the seat portions 12 and 13 by receiving the pressure in the extension hydraulic fluid passage 6, the extension hydraulic fluid passage 6 communicates directly with the cylinder lower chamber 2B and also communicates with the back-pressure chamber 18 through the back-pressure chamber inlet passage 15.

The bottom of the valve member 10 is provided with a hydraulic fluid passage 19 that allows the back-pressure chamber 18 to communicate with the cylinder lower chamber 2B. The hydraulic fluid passage 19 is provided with a normally-closed disk valve 20 (relief valve) that relieves the hydraulic fluid from the back-pressure chamber 18 to the cylinder lower chamber 2B when the pressure in the back-pressure chamber 18 reaches a predetermined pressure. The outer peripheral portion of the disk valve 20 is provided with a downstream orifice 21 (notch) that allows the back-pressure chamber 18 to communicate with the cylinder lower chamber 2B at all times. It should be noted that when the main disk valve 14 is closed, the effective flow path area of the back-pressure chamber inlet passage 15 is smaller than that of the downstream orifice 21, whereas when the main disk valve 14 is open, the former is larger than the latter.

Next, the compression damping force generating mechanism 9 will be explained. The compression damping force generating mechanism 9 has a valve member 22 secured to the cylinder upper chamber-side end of the piston 3, and a guide portion 23 of the valve member 22 is fitted to the piston 3, in the same way as in the extension damping force generating mechanism 8. The compression hydraulic fluid passage 7 opens between seat portions 24 and 25 projecting from the cylinder upper chamber-side end of the piston 3. A main disk valve 26 (main valve) is seated on the seat portions 24 and 25. The main disk valve 26 is guided by the guide portion 23. A back-pressure chamber inlet passage (upstream orifice) 27 is formed between the inner peripheral portion of the main disk valve 26 and the guide portion 23. The main disk valve 26 and the seat portion 24 constitute in combination a valve mechanism that opens or closes the back-pressure chamber inlet passage 27. The valve mechanism increases the effective flow path area of the back-pressure chamber inlet passage 27 when the main disk valve 26 opens. It should be noted that after the main disk valve 26 has opened to more than a predetermined degree, the flow path area of a passage leading to the back-pressure chamber inlet passage 27 becomes equal to the opening area of the passage 27 and so, the effective flow path area of the inlet passage 27 thereafter is kept constant.

An elastic seal member 28 is fitted to the valve member 22. The elastic seal member 28 presses the main disk valve 26 against the seat portions 24 and 25 through a seal ring 29. The elastic seal member 28 and the seal ring 29 form a back-pressure chamber 30 in the valve member 22 at the back of the main disk valve 26 such that the pressure in the back-pressure chamber 30 acts on the main disk valve 26 in the direction for closing the valve 26. When the main disk valve 26 lifts from the seat portions 24 and 25 by receiving the pressure in the compression hydraulic fluid passage 7, the compression hydraulic fluid passage 7 communicates directly with the cylinder upper chamber 2A and also communicates with the back-pressure chamber 30 through the back-pressure chamber inlet passage 27.

The bottom of the valve member 22 is provided with a hydraulic fluid passage 31 that allows the back-pressure chamber 30 to communicate with the cylinder upper chamber 2A. The hydraulic fluid passage 31 is provided with a normally-closed disk valve 32 (relief valve) that relieves the hydraulic fluid from the back-pressure chamber 30 to the cylinder upper chamber 2A when the pressure in the back-pressure chamber 30 reaches a predetermined pressure. The outer peripheral portion of the disk valve 32 is provided with a downstream orifice 33 (notch) that allows the back-pressure chamber 30 to communicate with the cylinder upper chamber 2A at all times. It should be noted that when the main disk valve 26 is closed, the effective flow path area of the back-pressure chamber inlet passage 27 is smaller than that of the downstream orifice 33, whereas when the main disk valve 26 is open, the former is larger than the latter.

It should be noted that the elastic seal members 16 and 28 are made of a flexible, elastic material, e.g. a rubber or synthetic resin material, so that during the open/close stroke of the main disk valves 14 and 26, the amount of change in the force created by elasticity relative to the amount of deformation is sufficiently small. The main disk valve 14 and the seal ring 17 may be formed in an integral structure, and so may be the main disk valve 26 and the seal ring 29. Further, the elastic seal members 16 and 28 may be secured to the main disk valves 14 and 26, respectively, which are integrally formed with the seal rings 17 and 29. With this arrangement, sealing performance between the main disk valve 14 and the elastic seal member 16 and between the main disk valve 26 and the elastic seal member 28 can be improved. In addition, it is possible to improve the assemble ability of these constituent members to the extension and compression damping force generating mechanisms 8 and 9.

The following is a description of the operation of this embodiment arranged as stated above. First, during the extension stroke of the piston rod 4, as the piston 3 slides in the cylinder 2, the hydraulic fluid in the cylinder upper chamber 2A flows into the cylinder lower chamber 2B through the extension hydraulic fluid passage 6 of the piston 3, and damping force is generated by the extension damping force generating mechanism 8. At this time, an amount of hydraulic fluid corresponding to an amount by which the piston rod 4 withdraws from the cylinder 2 flows out from the reservoir and passes through the base valve to flow into the cylinder lower chamber 2B, and the gas in the reservoir expands correspondingly, thereby compensating for a volumetric change in the cylinder 2.

In the extension damping force generating mechanism 8, the main disk valve 14 opens by receiving the pressure of hydraulic fluid in the extension hydraulic fluid passage 6, and damping force is generated according to the degree of opening of the main disk valve 14. In the extremely low speed region of the piston speed (i.e. in the initial stroke region of the piston rod 4), the inner peripheral portion of the main disk valve 14 rests on the seat portion 12, and hence the back-pressure chamber inlet passage 15 is closed. Therefore, the pressure in the back-pressure chamber 18 will not rise. Consequently, the initial valve opening pressure of the main disk valve 14 is low, and sufficiently small damping force is generated.

When it opens, the main disk valve 14 lifts simultaneously from the outer periphery-side seat portion 13 and the inner periphery-side seat portion 12 without deflecting. Accordingly, when the valve mechanism opens as a result of the main disk valve 14 opening, the effective flow path area of the back-pressure chamber inlet passage 15 increases, and the pressure in the back-pressure chamber 18 rises owing to the flow path area difference between the back-pressure chamber inlet passage 15 and the downstream orifice 21 at the outlet side. Thus, as the piston speed rises, the valve opening pressure of the main disk valve 14 rises, and damping force increases. When the pressure in the back-pressure chamber 18 reaches a predetermined pressure, the disk valve 20 opens to relieve the pressure from the back-pressure chamber 18 to the cylinder lower chamber 2B, thereby preventing an excessive rise in the valve opening pressure of the main disk valve 14, i.e. preventing extension damping force from rising excessively.

It should be noted that during the compression stroke of the piston rod 4 (described later), the pressure in the cylinder lower chamber 2B is introduced into the back-pressure chamber 18 through the downstream orifice 21. Consequently, the pressure in the back-pressure chamber 18 rises because the effective flow path area of the back-pressure chamber inlet passage 15 is smaller than that of the downstream orifice 21, as stated above. The main disk valve 14 is held in its closed position by the pressure in the back-pressure chamber 18.

During the compression stroke of the piston rod 4, as the piston 3 slides in the cylinder 2, the hydraulic fluid in the cylinder lower chamber 2B flows into the cylinder upper chamber 2A through the compression hydraulic fluid passage 7 of the piston 3, and damping force is generated by the compression damping force generating mechanism 9. At this time, an amount of hydraulic fluid corresponding to an amount by which the piston rod 4 enters the cylinder 2 flows into the reservoir through the base valve, causing the gas in the reservoir to be compressed, thereby compensating for a volumetric change in the cylinder 2.

In the compression damping force generating mechanism 9, the main disk valve 26 opens by receiving the pressure of hydraulic fluid in the compression hydraulic fluid passage 7, and damping force is generated according to the degree of opening of the main disk valve 26, in the same way as in the above-described extension damping force generating mechanism 8. In the extremely low speed region of the piston speed (i.e. in the initial stroke region of the piston rod 4), the inner peripheral portion of the main disk valve 26 rests on the seat portion 24, and hence the back-pressure chamber inlet passage 27 is closed. Therefore, the pressure in the back-pressure chamber 30 will not rise. Consequently, the initial valve opening pressure of the main disk valve 26 is low, and sufficiently small damping force is generated.

When it opens, the main disk valve 26 lifts simultaneously from the outer periphery-side seat portion 25 and the inner periphery-side seat portion 24 without deflecting. Accordingly, when the valve mechanism opens as a result of the main disk valve 26 opening, the effective flow path area of the back-pressure chamber inlet passage 27 increases, and the pressure in the back-pressure chamber 30 rises owing to the flow path area difference between the back-pressure chamber inlet passage 27 and the downstream orifice 33 at the outlet side. Thus, as the piston speed rises, the valve opening pressure of the main disk valve 26 rises, and damping force increases. When the pressure in the back-pressure chamber 30 reaches a predetermined pressure, the disk valve 32 opens to relieve the pressure from the back-pressure chamber 30 to the cylinder upper chamber 2A, thereby preventing an excessive rise in the valve opening pressure of the main disk valve 26, i.e. preventing compression damping force from rising excessively.

It should be noted that during the above-described extension stroke of the piston rod 4, the pressure in the cylinder upper chamber 2A is introduced into the back-pressure chamber 30 through the downstream orifice 33. Consequently, the pressure in the back-pressure chamber 30 rises because the effective flow path area of the back-pressure chamber inlet passage 27 is smaller than that of the downstream orifice 33, as stated above. The main disk valve 26 is held in its closed position by the pressure in the back-pressure chamber 18.

Thus, the effective flow path area of the back-pressure chamber inlet passage 15 (27) is increased by opening of the main disk valve 14 (26), whereby the pressure in the back-pressure chamber 18 (30) is adjusted. By doing so, the degree of freedom for setting damping force characteristics can be increased to obtain appropriate damping force characteristics. In addition, the extension and compression damping force generating mechanisms 8 and 9 can be simplified in structure and reduced in size.

The main disk valves 14 and 26 will not deflect when opening. Therefore, the valve opening pressure thereof is determined not by the flexibility of the main disk valves 14 and 26 but by the pressure in the back-pressure chambers 18 and 30 and the elasticity of the elastic seal members 16 and 28. Accordingly, the valve opening characteristics of the main disk valves 14 and 26 can be adjusted easily by controlling the pressure in the back-pressure chambers 18 and 30 through setting of the disk valves 20 and 32 and the downstream orifices 21 and 33, which are respectively provided downstream of the back-pressure chambers 18 and 30.

Further, damping force does not depend on the deflection of the main disk valves 14 and 26. In addition, during the open/close stroke of the main disk valves 14 and 26, the amount of change in the force created by elasticity of the elastic seal members 16 and 28 relative to the amount of deformation thereof is sufficiently small. Therefore, even when the main disk valves 14 and 26 open to a large degree, resistance to the opening of the valves 14 and 26 will not increase excessively, and hence damping force will not rise excessively.

Figure 2:
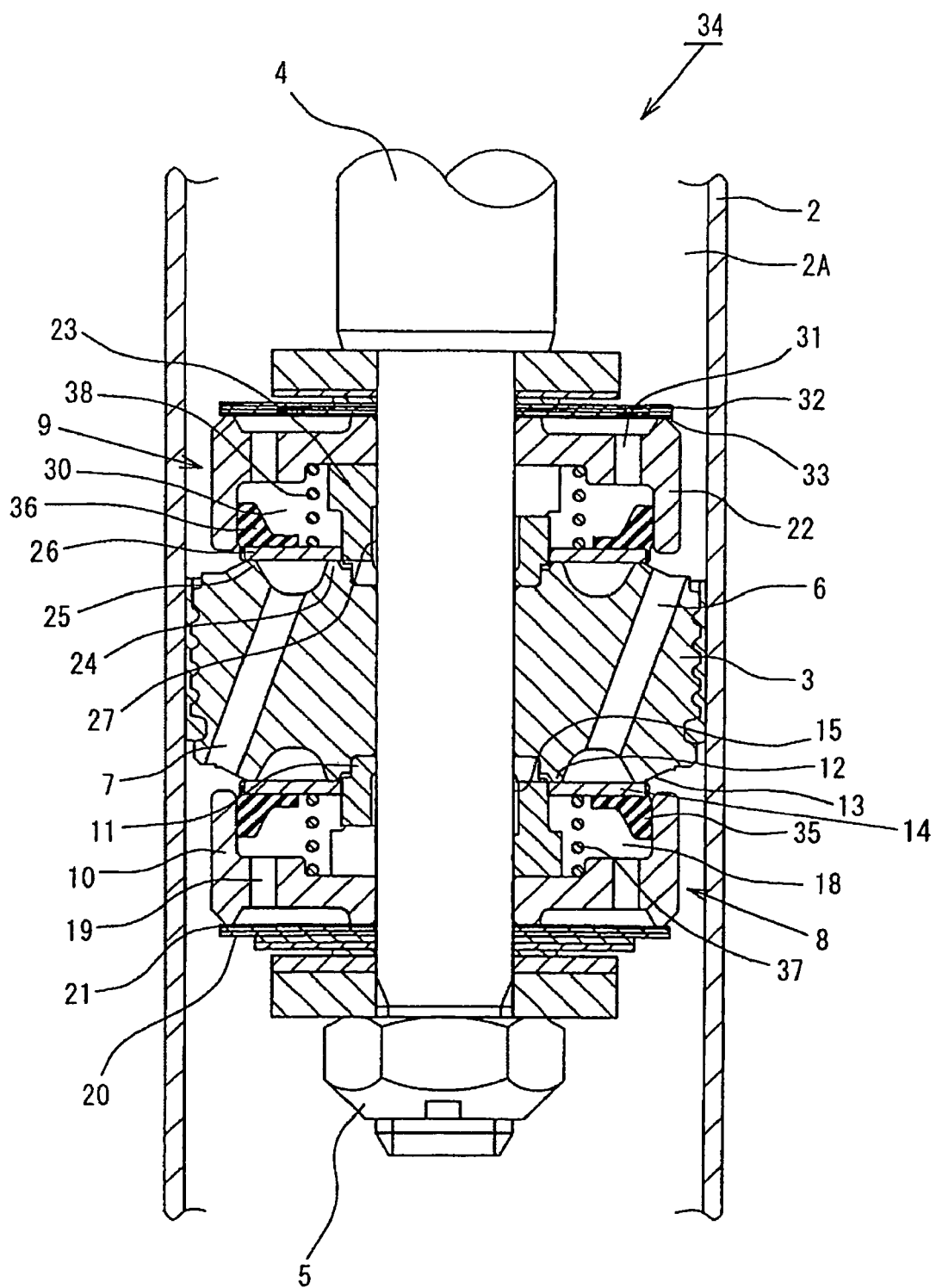
FIG. 2 is a vertical sectional view of an essential part of a hydraulic shock absorber according to a second embodiment of the present invention.

Next, a second embodiment of the present invention will be described with reference to FIG. 2. It should be noted that in the second embodiment, members or portions that are similar or equivalent to those of the foregoing first embodiment are denoted by the same reference numerals as those used in the first embodiment, and only the portions in which the second embodiment differs from the first embodiment will be explained in detail.

In a hydraulic shock absorber 34 according to the second embodiment, the guide portions 11 and 23 are discrete from the valve members 10 and 22. The back-pressure chamber inlet passages 15 and 27 are formed by the guide portions 11 and 23, respectively. The seal rings 17 and 29 and the elastic seal members 16 and 28 are omitted in the second embodiment, but instead oil seals 35 and 36 are secured to the respective outer peripheral portions on the back of the main disk valves 14 and 26. The oil seals 35 and 36 are slidably fitted to the respective cylindrical portions of the valve members 10 and 22 to form back-pressure chambers 18 and 30. In addition, coil springs 37 and 38 are provided in the back-pressure chambers 18 and 30, respectively, to press the main disk valves 14 and 26 against the seat portions 12 and 13 and the seat portions 24 and 25.

The above-described arrangement offers advantageous effects similar to those in the foregoing first embodiment. Further, because the main disk valves 14 and 26 and the oil seals 35 and 36 are secured to each other, respectively, sealing performance between these members can be enhanced. Hence, the sealing properties of the back-pressure chambers 18 and 30 can be improved. In addition, it is possible to improve the assembleability of these constituent members to the extension and compression damping force generating mechanisms 8 and 9.

Figure 3:
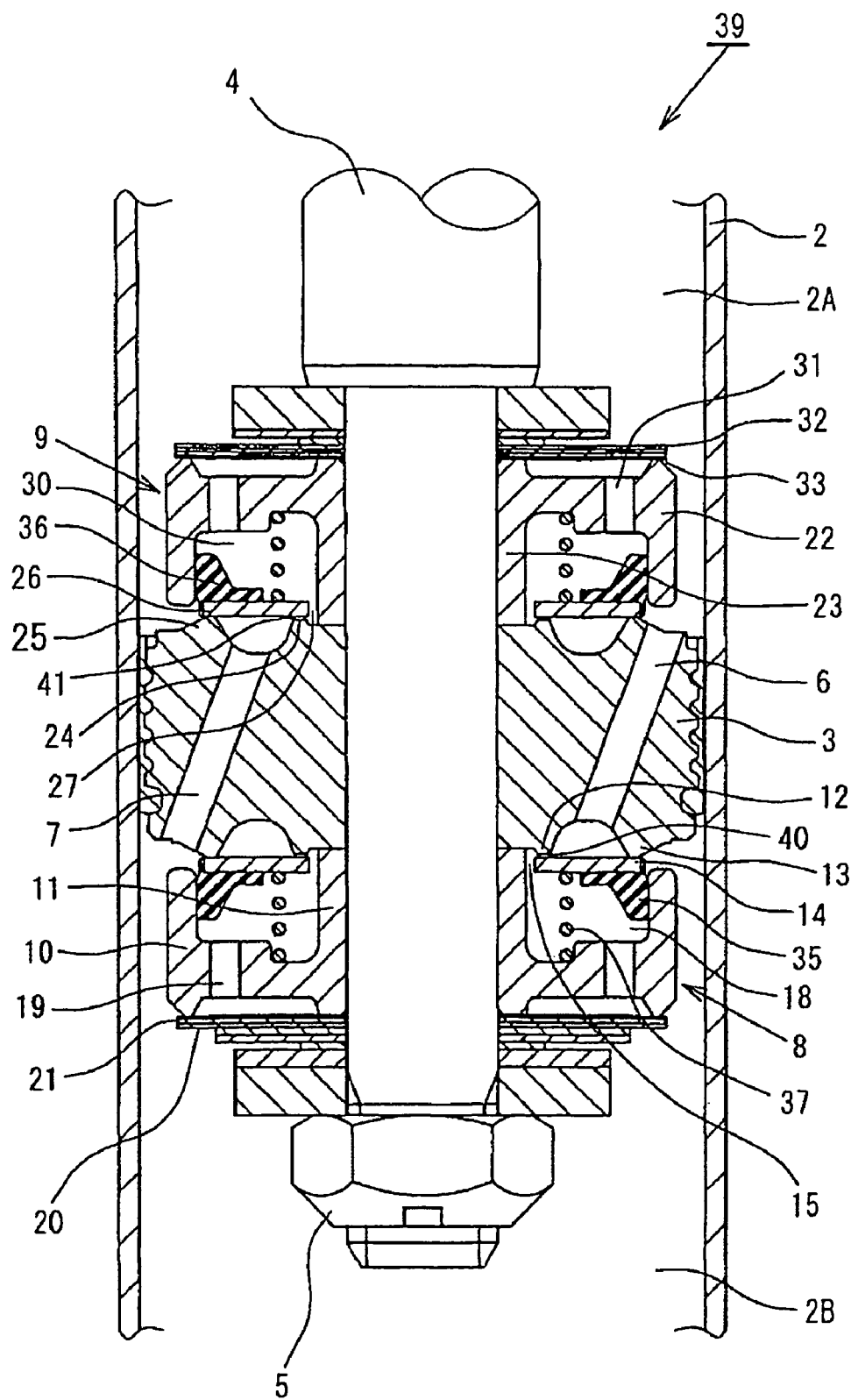
FIG. 3 is a vertical sectional view of an essential part of a hydraulic shock absorber according to a third embodiment of the present invention.
Figure 4:
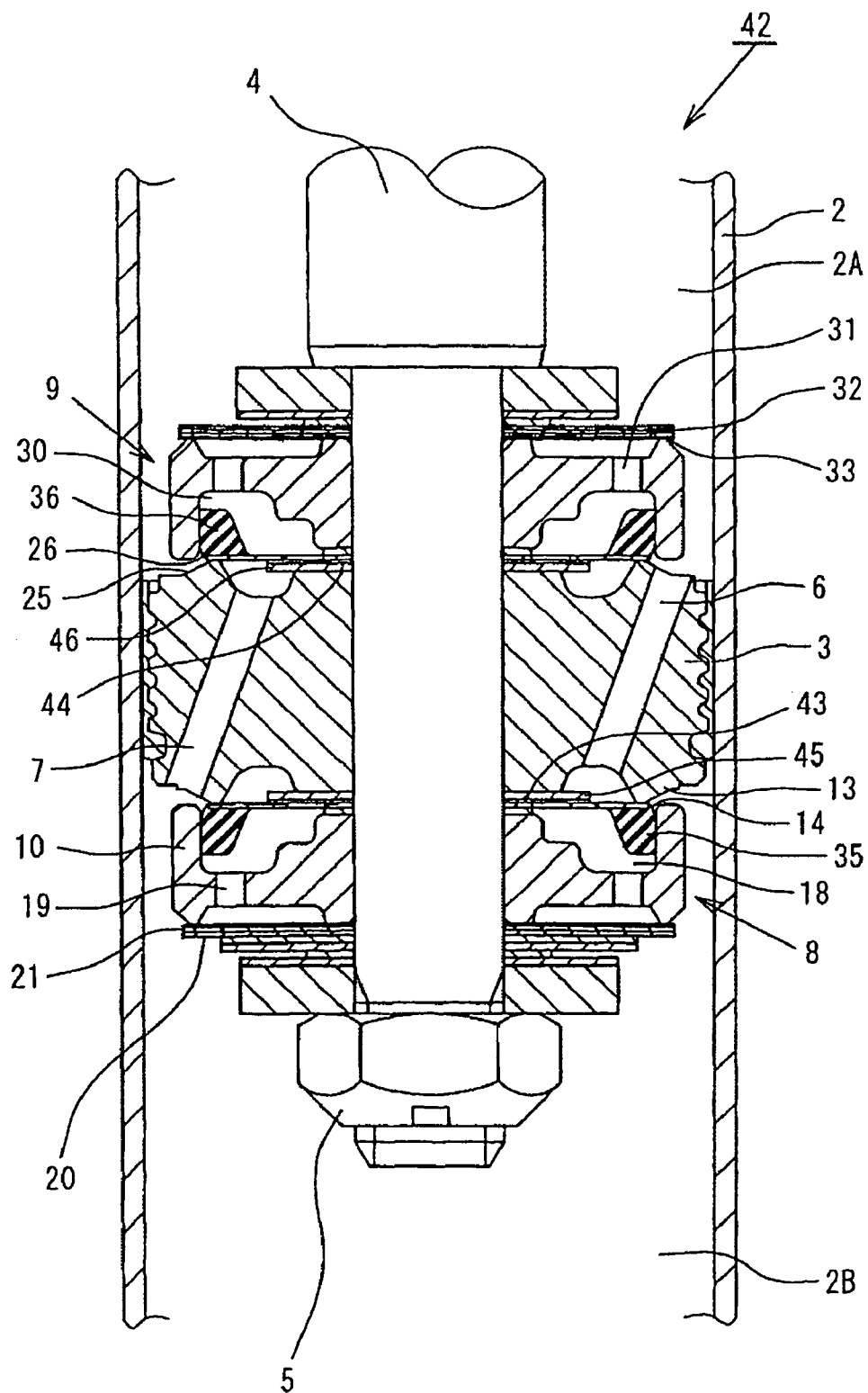
FIG. 4 is a vertical sectional view of an essential part of a hydraulic shock absorber according to a fourth embodiment of the present invention.

Next, a third embodiment of the present invention will be described with reference to FIG. 3. It should be noted that in the third embodiment, members or portions that are similar or equivalent to those of the foregoing first embodiment are denoted by the same reference numerals as those used in the first embodiment, and only the portions in which the third embodiment differs from the first embodiment will be explained in detail.

In a hydraulic shock absorber 39 according to the third embodiment, the guide portions 11 and 23 are integral with the valve members 10 and 22, respectively, as is the case in the first embodiment. However, the seal rings 17 and 29 and the elastic seal members 16 and 28 are omitted in the third embodiment, but instead oil seals 35 and 36 are secured to the respective outer peripheral portions on the back of the main disk valves 14 and 26. The oil seals 35 and 36 are slidably fitted to the respective cylindrical portions of the valve members 10 and 22 to form back-pressure chambers 18 and 30. In addition, the inner periphery-side seat portions 12 and 24, on which the main disk valves 14 and 26 liftably rest, are each provided with at least one orifice 40 (41) defined by a notch extending from the outer peripheral edge of the seat portion 12 (24) to the inner peripheral edge thereof. The orifices 40 and 41 allow the back-pressure chambers 18 and 30 to communicate with the extension and compression hydraulic fluid passages 6 and 7, respectively, at all times. The flow path area of the orifice 40 is sufficiently smaller than that of the downstream orifice 21 of the back-pressure chamber 18. Similarly, the flow path area of the orifice 41 is sufficiently smaller than that of the downstream orifice 33 of the back-pressure chamber 30. Preferably, the former flow path area is less than about one-third of the latter.

The above-described arrangement offers advantageous effects similar to those in the foregoing first embodiment. Further, the orifices 40 and 41 allow a slight amount of pressure to be introduced from the extension and compression hydraulic fluid passages 6 and 7 into the back-pressure chambers 18 and 30 in the extremely low piston speed region (i.e. in the initial stroke region of the piston rod 4), thereby enabling adjustment of damping force in the extremely low piston speed region. Consequently, it is possible to suppress influence of variations in the effective area of gaps communicating with the back-pressure chambers 18 and 30 when the main disk valves 14 and 26 are closed. Thus, stable orifice characteristics can be obtained in the extremely low piston speed region. In this regard, care should be taken not to excessively increase the flow path area of the orifices 40 and 41. If the flow path area of the orifices 40 and 41 is excessively large, the compression-side main disk valve 26 is likely to lift during the extension stroke, and the extension-side main disk valve 14 is likely to lift during the compression stroke. Consequently, stable damping force cannot be obtained.

Next, a fourth embodiment of the present invention will be described with reference to FIGS. 4 to 9. It should be noted that in the fourth embodiment, members or portions that are similar or equivalent to those of the foregoing third embodiment are denoted by the same reference numerals as those used in the third embodiment, and only the portions in which the fourth embodiment differs from the third embodiment will be explained in detail.

Figure 5:
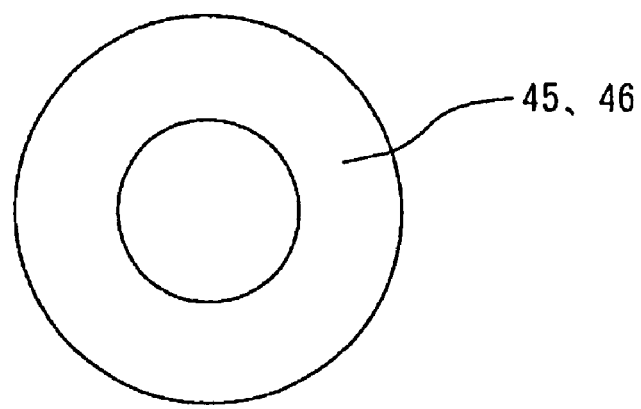
FIG. 5 is a plan view of a blocking disk stacked over a main disk valve of the hydraulic shock absorber shown in FIG. 4.
Figure 6:
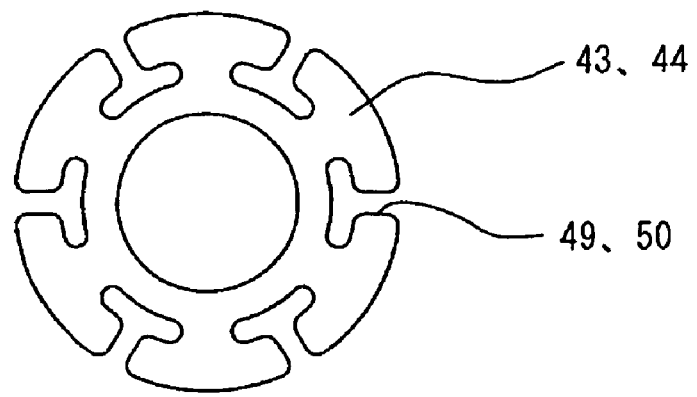
FIG. 6 is a plan view of a notched disk stacked over the main disk valve of the hydraulic shock absorber shown in FIG. 4.
Figure 7:
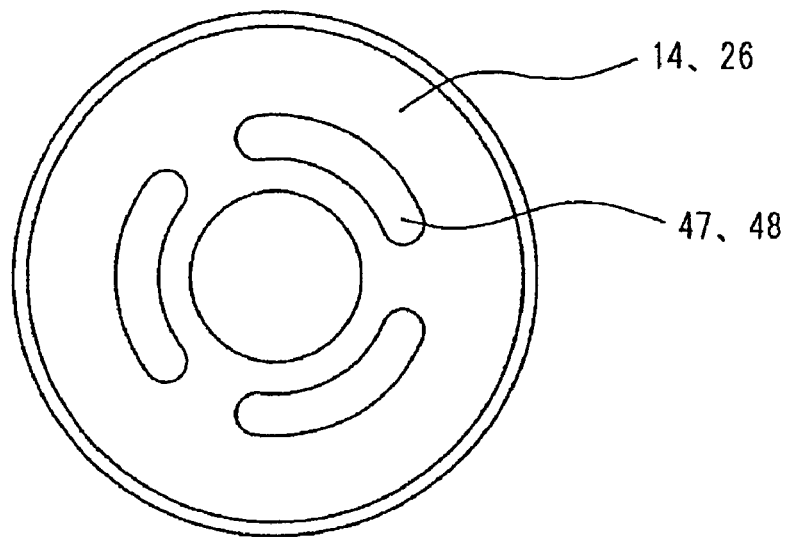
FIG. 7 is a plan view of the main disk valve of the hydraulic shock absorber shown in FIG. 4.
Figure 8:
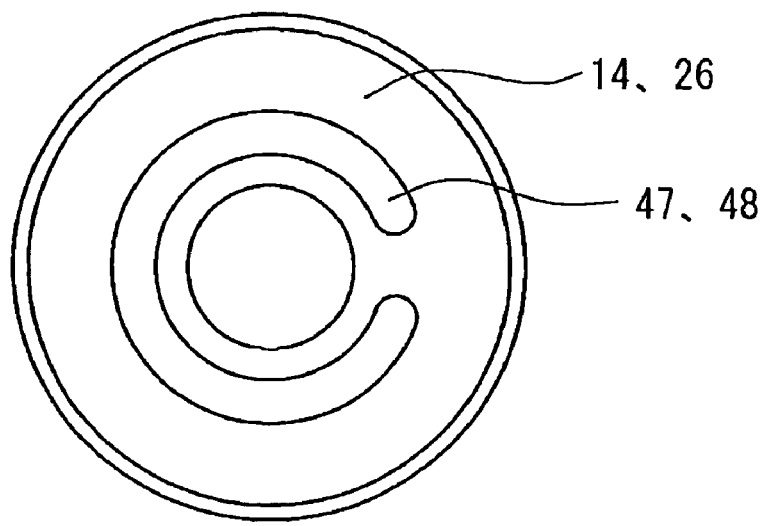
FIG. 8 is a plan view of a modification of the main disk valve of the hydraulic shock absorber shown in FIG. 4.

In a hydraulic shock absorber 42 according to the fourth embodiment, the main disk valves 14 and 26 are flexible and clamped at their inner peripheral portions between the respective valve members 10 and the piston 3. The main disk valves 14 and 26 open by deflecting. A notched disk 43 as shown in FIG. 6 and a blocking disk 45 as shown in FIG. 5 are stacked in the order mentioned at the side of the main disk valve 14 closer to the extension hydraulic fluid passage 6 (i.e. at the upstream side of the main disk valve 14). Similarly, a notched disk 44 as shown in FIG. 6 and a blocking disk 46 as shown in FIG. 5 are stacked in the order mentioned at the side of the main disk valve 26 closer to the compression hydraulic fluid passage 7 (i.e. at the upstream side of the main disk valve 26). As shown in FIG. 7 or 8, the main disk valves 14 and 26 have circumferentially extending arcuate openings 47 and 48 provided in respective portions closer to the inner peripheries thereof. The notched disks 43 and 44 are each provided with at least one approximately T-shaped notch 49 (50) including a circumferential opening and a radial opening extending from the circumferential opening to the outer periphery. The blocking disks 45 and 46 block at least the respective portions of the notches 49 and 50 of the notched disks 43 and 44 that face the openings 47 and 48 of the main disk valves 14 and 26 (in the illustrated example, the blocking disks 45 and 46 block the whole openings of the notches 49 and 50 on the respective end surfaces of the notched disks 43 and 44).

Figure 9:
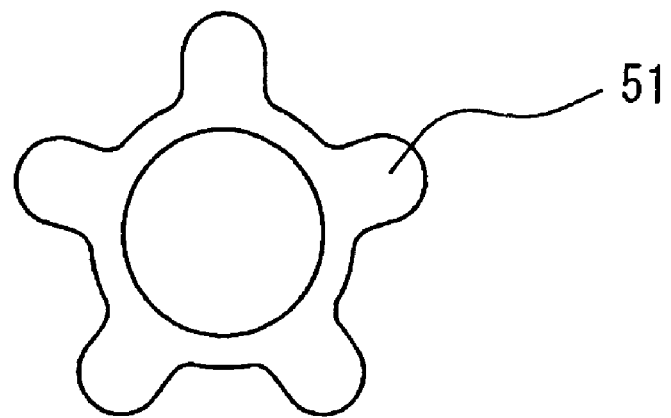
FIG. 9 is a plan view of a spring member for pressing the main disk valve of the hydraulic shock absorber shown in FIG. 4 against a seat portion.

The notches 49 and 50 of the notched disks 43 and 44 and the openings 47 and 48 of the main disk valves 14 and 26 form in combination back-pressure chamber inlet passages (upstream orifices) that allow the extension and compression hydraulic fluid passages 6 and 7 to communicate with the back-pressure chambers 18 and 30, respectively. Further, the openings 47 and 48 of the main disk valves 14 and 26, the notched disks 43 and 44 and the blocking disks 45 and 46 constitute in combination valve mechanisms that adjust the respective effective flow path areas of the back-pressure chamber inlet passages. When the main disk valve 14 (26) opens by deflecting [lifts from the seat portion 13 (25)], it simultaneously separates from the notched disk 43 (44) to increase the effective flow path area of the notch 49 (50). It should be noted that a spring member 51 as shown in FIG. 9 may be provided between the back of each of the main disk valves 14 and 26 and the associated valve member 10 to press the main disk valves 14 and 26 against the seat portions 13 and 25.

The above-described arrangement offers advantageous effects similar to those in the foregoing third embodiment. Further, in this embodiment, back-pressure chamber inlet passages (upstream orifices) for controlling a very small amount of flow are formed by the T-shaped notches 49 and 50 of the notched disks 43 and 44. Accordingly, a desired flow path area when the main disk valve 14 (26) is closed can be set easily by appropriately varying the width, thickness and number of notches 49 (50). Thus, it becomes easy to control the dimensional accuracy and hence possible to obtain stable damping force having minimal variations.

It should be noted that in the above-described fourth embodiment, the notched disks 43 and 44 may be integrated with the main disk valves 14 and 26, respectively, so that when the main disk valve 14 (26) opens, the notched disk 43 (44) separates from the blocking disk 45 (46), thereby increasing the effective flow path area of the back-pressure chamber inlet passage.

Figure 10:
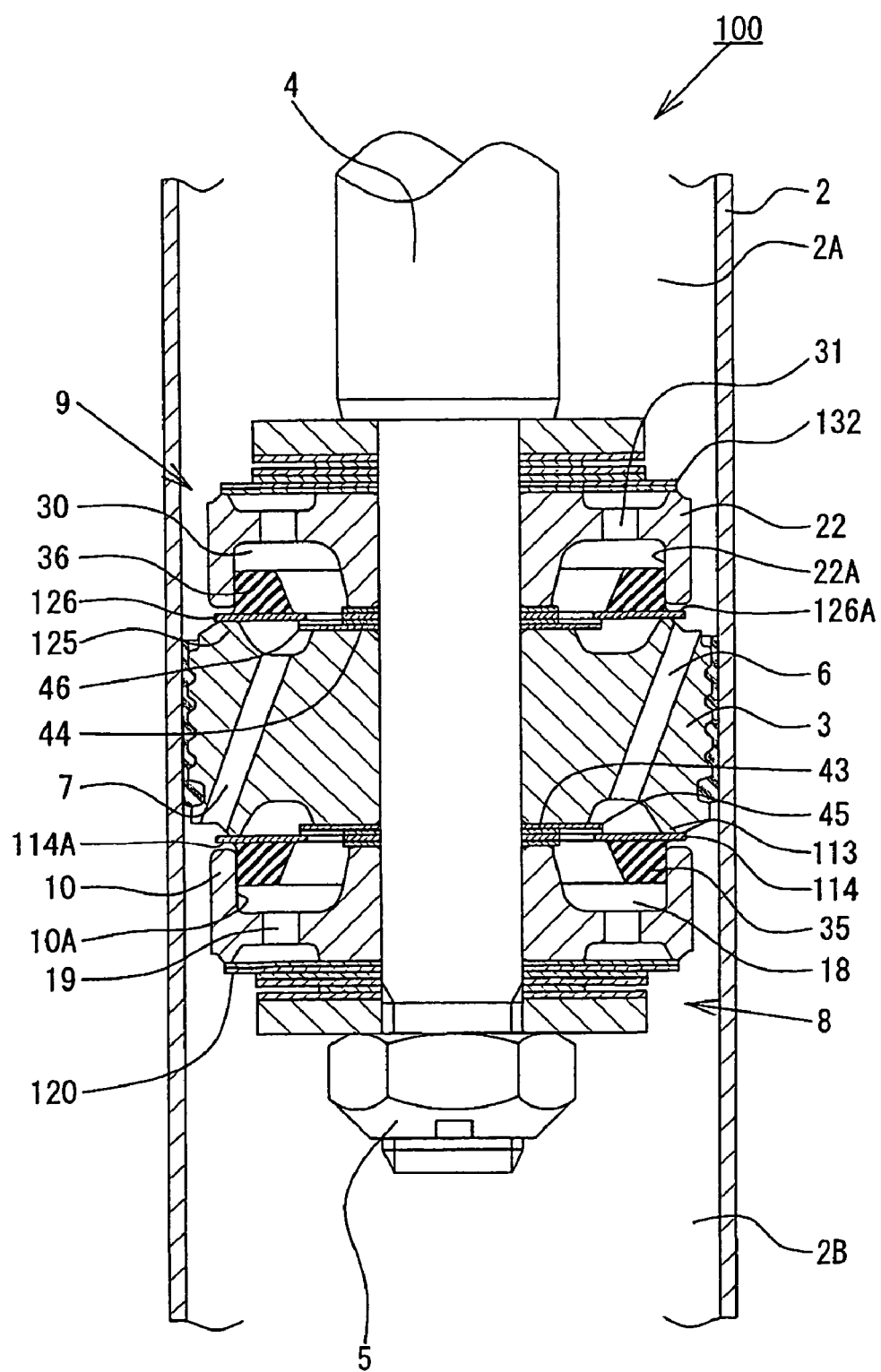
FIG. 10 is a vertical sectional view of an essential part of a hydraulic shock absorber according to a fifth embodiment of the present invention.

Next, a fifth embodiment of the present invention will be described with reference to FIG. 10. It should be noted that in the fifth embodiment, members or portions that are similar or equivalent to those of the foregoing fourth embodiment are denoted by the same reference numerals as those used in the fourth embodiment, and only the portions in which the fifth embodiment differs from the fourth embodiment will be explained in detail.

In the foregoing fourth embodiment, during the compression stroke, for example, the pressure in the cylinder lower chamber 2B acts on a portion of the main disk valve 14 that projects radially outward from the outer periphery of the seat portion 13, and also acts on the oil seal 35. Consequently, force acts on the main disk valve 14 so as to open it although the main disk valve 14 should normally be closed during the compression stroke. In order to prevent the main disk valve 14 from being opened by this force, the downstream orifice 21 is provided, whereby, during the compression, pressure is introduced into the back-pressure chamber 18 through the downstream orifice 21, and the main disk valve 14 is held in its closed position by the pressure in the back-pressure chamber 18.

Accordingly, the downstream orifice 21 is necessary, and there are restrictions in selection of the passage area thereof.

The fifth embodiment makes it possible to disuse the downstream orifice 21 or to minimize the area thereof. For this purpose, a seat portion 113 (125) is so formed to have its outer periphery come radially outward to have a diameter larger than the inner diameter of the inner peripheral surface 10A (22A) (the "sealing surface" in the present invention) of the valve member 10 (22) on which the oil seal 35 (36) slides. In addition, the outermost peripheries of the main disk valves 114 and 126 are extended radially outward to provide pressure-receiving portions 114A and 126A.

The above-described arrangement allows the pressure in the cylinder lower chamber 2B to act on the main disk valve 114 more strongly in the valve closing direction than in the valve opening direction during the compression stroke (owing to the pressure-receiving area difference). Accordingly, there is no possibility of the main disk valve 114 opening undesirably even if the downstream orifice 21 in the fourth embodiment is disused.

Similarly, during the extension stroke, the pressure in the cylinder upper chamber 2A acts on the main disk valve 126 more strongly in the valve closing direction than in the valve opening direction (owing to the pressure-receiving area difference). Accordingly, there is no possibility of the main disk valve 126 opening undesirably even if the downstream orifice 33 in the fourth embodiment is disused.

The above-described arrangement offers advantageous effects similar to those in the foregoing fourth embodiment. Further, there is no possibility of the main valve opening during the opposite stroke where the main valve should normally be closed even if the downstream orifice is disused or reduced in area.

It should be noted that the present invention is not necessarily limited to the foregoing embodiments but can be modified in a variety of ways without departing from the gist of the present invention.

What is claimed is:

1. A hydraulic shock absorber comprising:
a cylinder having a hydraulic fluid sealed therein;
a piston slidably fitted in said cylinder;
a piston rod connected at one end thereof to said piston, the other end of said piston rod extending to an outside of said cylinder;
a main valve that generates damping force by controlling flow of hydraulic fluid induced by sliding movement of said piston;
a back-pressure chamber that allows its internal pressure to act on said main valve in a direction for closing said main valve;
and a back-pressure chamber inlet passage through which a part of the hydraulic fluid of said flow of hydraulic fluid is introduced into said back-pressure chamber to control opening of said main valve,
wherein a valve mechanism is provided that increases a flow path area of said back-pressure chamber inlet passage when said main valve opens so that the damping force is not adjusted from outside of the hydraulic shock absorber.

2. A hydraulic shock absorber according to claim 1, wherein a relief valve is provided that opens when a pressure in said back-pressure chamber reaches a predetermined pressure to relieve the pressure.

3. A hydraulic shock absorber according to claim 1, wherein an elastic seal member is integrally secured to an outer peripheral portion on a back of said main valve to partially define said back-pressure chamber.

4. A hydraulic shock absorber according to claim 1, wherein said valve mechanism has at least one orifice in a portion of said piston on which said main valve liftably rests, said orifice extending from an outer peripheral edge of said portion of the piston to an inner peripheral edge thereof, so that the hydraulic fluid is introduced into said back-pressure chamber through said orifice.

5. A hydraulic shock absorber according to claim 3, wherein a seat portion for said main valve to rest on is formed to have a portion which comes radially outward of a sealing surface of said elastic seal member that seals said back-pressure chamber.

6. A hydraulic shock absorber according to claim 1, wherein a downstream orifice is provided that allows the hydraulic fluid in said back-pressure chamber to communicate with a downstream side of said back-pressure chamber, wherein when said main valve is closed, said back-pressure chamber inlet passage has a smaller flow path area than that of said downstream orifice.

7. A hydraulic shock absorber comprising:
a cylinder having a hydraulic fluid sealed therein;
a piston slidably fitted in said cylinder;
a piston rod connected at one end thereof to said piston, the other end of said piston rod extending to an outside of said cylinder;

a main valve that generates damping force by controlling flow of hydraulic fluid induced by sliding movement of said piston;

a back-pressure chamber that allows its internal pressure to act on said main valve in a direction for closing said main valve; and a back-pressure chamber inlet passage through which a part of the hydraulic fluid of said flow of hydraulic fluid is introduced into said back-pressure chamber to control opening of said main valve, wherein a valve mechanism is provided that increases a flow path area of said back-pressure chamber inlet passage when said main valve opens, wherein said valve mechanism includes:

an opening provided in said main valve;

a notched disk installed upstream of said main valve and provided with at least one radially extending notch communicating with said opening; and a blocking disk provided upstream of said notched disk to block a portion of said notch that faces said opening, wherein when said main valve opens, it separates from said notched disk.

* * * * *